(12) United States Patent
Kitakado

(10) Patent No.: US 10,142,954 B2
(45) Date of Patent: Nov. 27, 2018

(54) BASE STATION AND WIRELESS COMMUNICATION METHOD

(71) Applicant: KYOCERA CORPORATION, Kyoto (JP)

(72) Inventor: Jun Kitakado, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 129 days.

(21) Appl. No.: 15/296,708

(22) Filed: Oct. 18, 2016

(65) Prior Publication Data

US 2017/0118733 A1    Apr. 27, 2017

(30) Foreign Application Priority Data

Oct. 21, 2015  (JP) ................. 2015-206847

(51) Int. Cl.
   - *H04W 56/00*   (2009.01)
   - *H04B 7/155*   (2006.01)
   - *H04W 16/26*   (2009.01)
   - *H04W 72/04*   (2009.01)
   - *H04W 72/08*   (2009.01)

(52) U.S. Cl.
   CPC ...... *H04W 56/004* (2013.01); *H04B 7/15514* (2013.01); *H04W 16/26* (2013.01); *H04W 72/0446* (2013.01); *H04W 72/082* (2013.01)

(58) Field of Classification Search
   CPC ............... H04W 56/004; H04W 16/26; H04W 72/0446; H04W 72/082; H04B 7/15514
   See application file for complete search history.

(56) References Cited

U.S. PATENT DOCUMENTS

| | | | |
|---|---|---|---|
| 9,628,239 B2* | 4/2017 | Ji | H04L 5/0053 |
| 2013/0201902 A1* | 8/2013 | Nagata | H04W 72/04 370/315 |
| 2016/0198475 A1* | 7/2016 | Uchiyama | H04W 16/32 370/329 |
| 2016/0277166 A1* | 9/2016 | Liu | H04L 25/03006 |
| 2017/0078077 A1* | 3/2017 | Hessler | H04L 27/2646 |

FOREIGN PATENT DOCUMENTS

JP         2012-205091 A    10/2012

* cited by examiner

*Primary Examiner* — Asad M Nawaz
*Assistant Examiner* — Thomas R Cairns
(74) *Attorney, Agent, or Firm* — Studebaker & Brackett PC

(57) ABSTRACT

A base station includes: a wireless communication unit that performs wireless communication with a relay device; a storage that stores information on a reflected wave of a communication channel used to communicate with the relay device; and a controller that: estimates from the information whether a communication channel upon establishing a wireless channel with the relay device is affected by a reflected wave; allocates the communication channel as the wireless channel with the relay device in a case where it is estimated from the information that the communication channel is not affected by the reflected wave; and does not allocate the communication channel as the wireless channel with the relay device in a case where it is estimated from the information that the communication channel is affected by the reflected wave.

12 Claims, 9 Drawing Sheets

FIG. 9

| SPECIAL LIST | |
|---|---|
| FREQUENCY | RECEPTION LEVEL (COMMUNICATION QUALITY) |
| F1 | XX dB |

| NORMAL LIST | |
|---|---|
| FREQUENCY | RECEPTION LEVEL (COMMUNICATION QUALITY) |
| F3 | XX dB |

| EXCLUSION LIST | |
|---|---|
| FREQUENCY | RECEPTION LEVEL (COMMUNICATION QUALITY) |
| F2 | XX dB |
| F4 | XX dB |
| ... | ... |

BASE STATION AND WIRELESS COMMUNICATION METHOD

CROSS-REFERENCE TO RELATED APPLICATION

This application claims priority from Japanese Patent Application No. 2015-206847 filed on Oct. 21, 2015, the entire subject matter of which is incorporated herein by reference.

TECHNICAL FIELD

This disclosure relates to a base station that performs wireless communication and a wireless communication method.

BACKGROUND

There is a so-called wireless backhaul technology used for connection between areas, where no wire reaches or a wired cable cannot be laid, such as remote islands or depopulated regions. As one technique, there is known a technology in which a relay device is used to connect a base station and a terminal to each other with wireless communication (for example, see JP-A-2012-205091).

The relay device includes a service-side (for a service channel) wireless device that performs wireless communication with the terminal and a backhaul wireless device that communicates with the base station. After installation of the relay device, the relay station tries a call to the base station, and a backhaul wireless channel is established between the relay station and the base station. At this time, the relay device is used as a terminal and performs a normal calling process. It is assumed herein that the base station and the relay device after the installation are fixed to not be movable.

SUMMARY

A base station of this disclosure includes: a wireless communication unit that performs wireless communication with a relay device; a storage that stores information on a reflected wave of a communication channel used to communicate with the relay device; and a controller that: estimates from the information whether a communication channel upon establishing a wireless channel with the relay device is affected by a reflected wave; allocates the communication channel as the wireless channel with the relay device in a case where it is estimated from the information that the communication channel is not affected by the reflected wave; and does not allocate the communication channel as the wireless channel with the relay device in a case where it is estimated from the information that the communication channel is affected by the reflected wave.

A wireless communication method of a base station of this disclosure including a wireless communication unit that performs wireless communication with a relay device and a storage that stores information on a reflected wave of a communication channel used to communicate with the relay device, the method includes: estimating from the information whether a communication channel upon establishing a wireless channel with the relay device is affected by a reflected wave; allocating the communication channel as the wireless channel with the relay device in a case where it is estimated from the information that the communication channel is not affected by the reflected wave; and not allocating the communication channel as the wireless channel with the relay device in a case where it is estimated from the information that the communication channel is affected by the reflected wave.

This disclosure is to provide a base station, which utilizes a wireless backhaul and is configured not to be affected by reflected waves or interference waves of radio waves transmitted from a relay station, and a wireless communication method thereof.

BRIEF DESCRIPTION OF THE DRAWINGS

The foregoing and additional features and characteristics of this disclosure will become more apparent from the following detailed descriptions considered with the reference to the accompanying drawings, wherein:

FIG. 9 is a diagram illustrating a special list, a normal list, and an exclusion list.

DETAILED DESCRIPTION

Embodiments of this disclosure will be described below with reference to the accompanying drawings.

Figure 1:
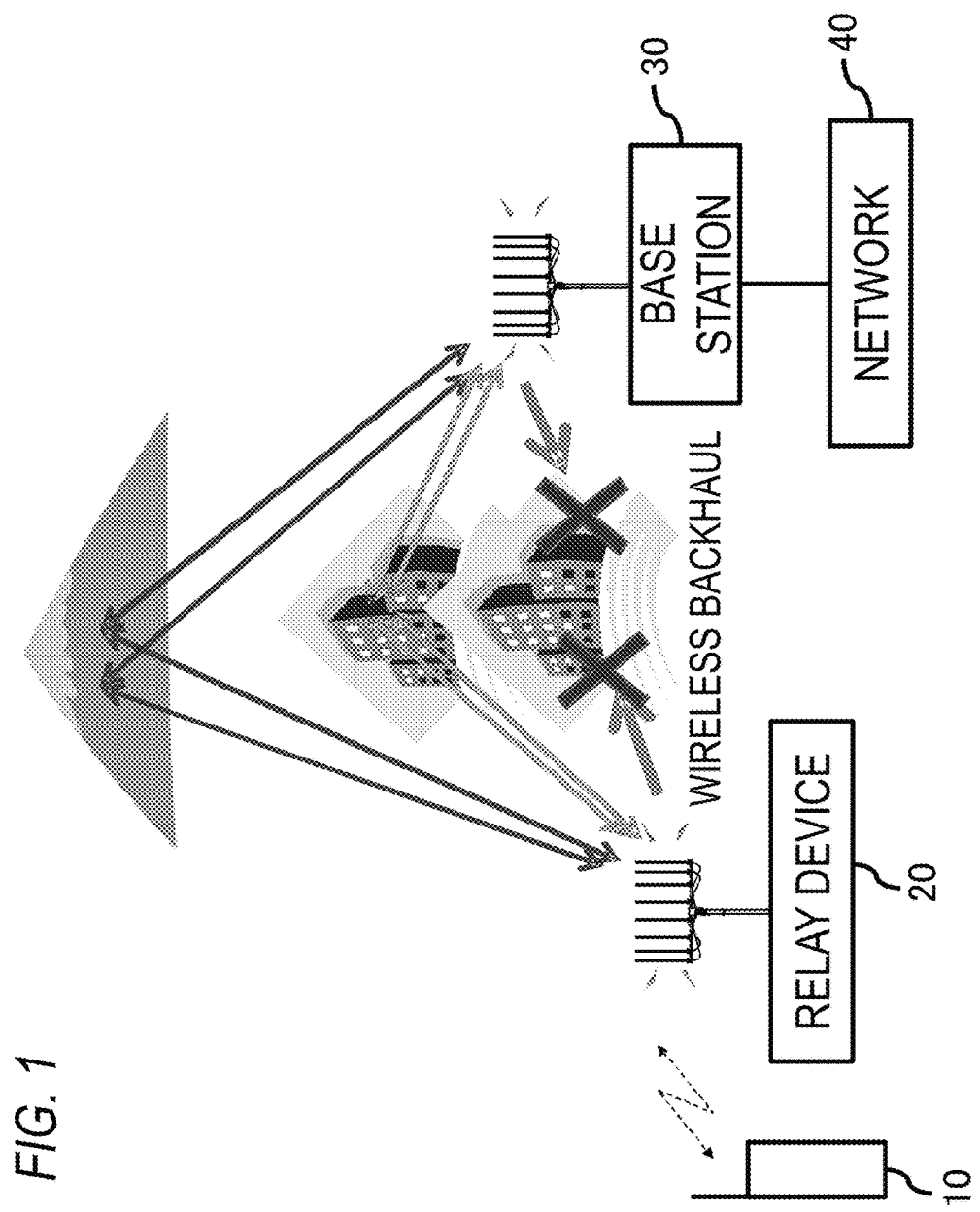
FIG. 1 is a diagram illustrating a wireless communication system according to a first embodiment of this disclosure.

FIG. 1 is a configuration diagram illustrating a wireless communication system according to a first embodiment of this disclosure. The wireless communication system indicated in FIG. 1 includes a wireless terminal 10, a relay device 20, and a base station 30. The relay device 20 is configured to relay information between the wireless terminal 10 and the base station 30, and the base station 30 is configured to transfer the information between the relay device 20 and a network 40.

The base station 30 can also communicate with the wireless terminal 10. However, since this configuration will not related to this disclosure, the description thereof is not made in the first embodiment of this disclosure. The network 40 is a network that is provided by a communication provider, for example, and is a network that transfers information between terminals.

In addition, both of the relay device 20 and the base station 30 are fixed and installed. Both of them perform communication using a time division multiplexing LTE (Long Term Evolution), a frequency division multiplexing LTE, or other communication schemes. Furthermore, both of them may perform communication at a high frequency band such as a millimeter-wave.

In a case where the distance between the relay device 20 and the base station 30 is short and a shielding material does not exist between the relay device 20 and the base station 30, a wireless communication quality between the relay device 20 and the base station 30 will be good. However, in a situation such as an urban area where there is no line-of-sight between the relay device 20 and the base station 30 due to buildings surrounded from every quarter as illustrated in FIG. 1 or in a situation where the relay device 20 and the base station 30 are installed at a location such as a basin in which reflected waves arrive from a mountain, however, the wireless communication quality between the relay device 20 and the base station 30 will be not good. In particular, radio waves reflected from a distant mountain will be arrived as delay waves. When the delay wave has a signal level of extent which cannot be neglected, reception performance deteriorates as in a case of receiving interference wave.

A phase of the delay wave varies depending on a positional relation between communication partners (path distance) and a communication frequency. Since both of the relay device 20 and the base station 30 are fixed, the presence or absence of influence of the delay wave is determined by the communication frequency in the communication between the relay device 20 and the base station 30.

For example, when the wireless communication is performed between the relay device 20 and the base station 30, reflected waves from adjacent buildings are cancelled and a reception level becomes smaller. Moreover, when reflected waves from a distance are constructively strengthened at the same phase, signals to be received to the base station 30 are mainly the reflected waves (delay waves) from the distance. Therefore, a synchronous position is deviated backward.

Normally, at a time when establishing communication between the relay device 20 and the base station 30, first, communication is performed with a control channel including a certain frequency, then a communication channel (frequency) is searched by carrier sensing or the like, whereby the relay device 20, and the base station 30 communicates with each other using the searched communication channel. The relay device 20 selects a frequency which has a good communication quality from the plurality of base stations 30 so that a frequency not affected by the delay wave is selected in the control channel. Therefore, when a wireless signal of the communication channel is delayed, since reception timing of the communication channel will be deviated from reception timing of the control channel, reception performance is degraded.

On the other hand, there is also a case where the communication frequency between the relay device 20 and the base station 30 is not affected by the delay waves if the reflected waves from the adjacent buildings are constructively strengthened and the reflected waves (delay waves) from a distance are destructively weakened. In this way, it is important not to allocate the communication frequency capable of being the delay wave to the communication channel.

Figure 2:
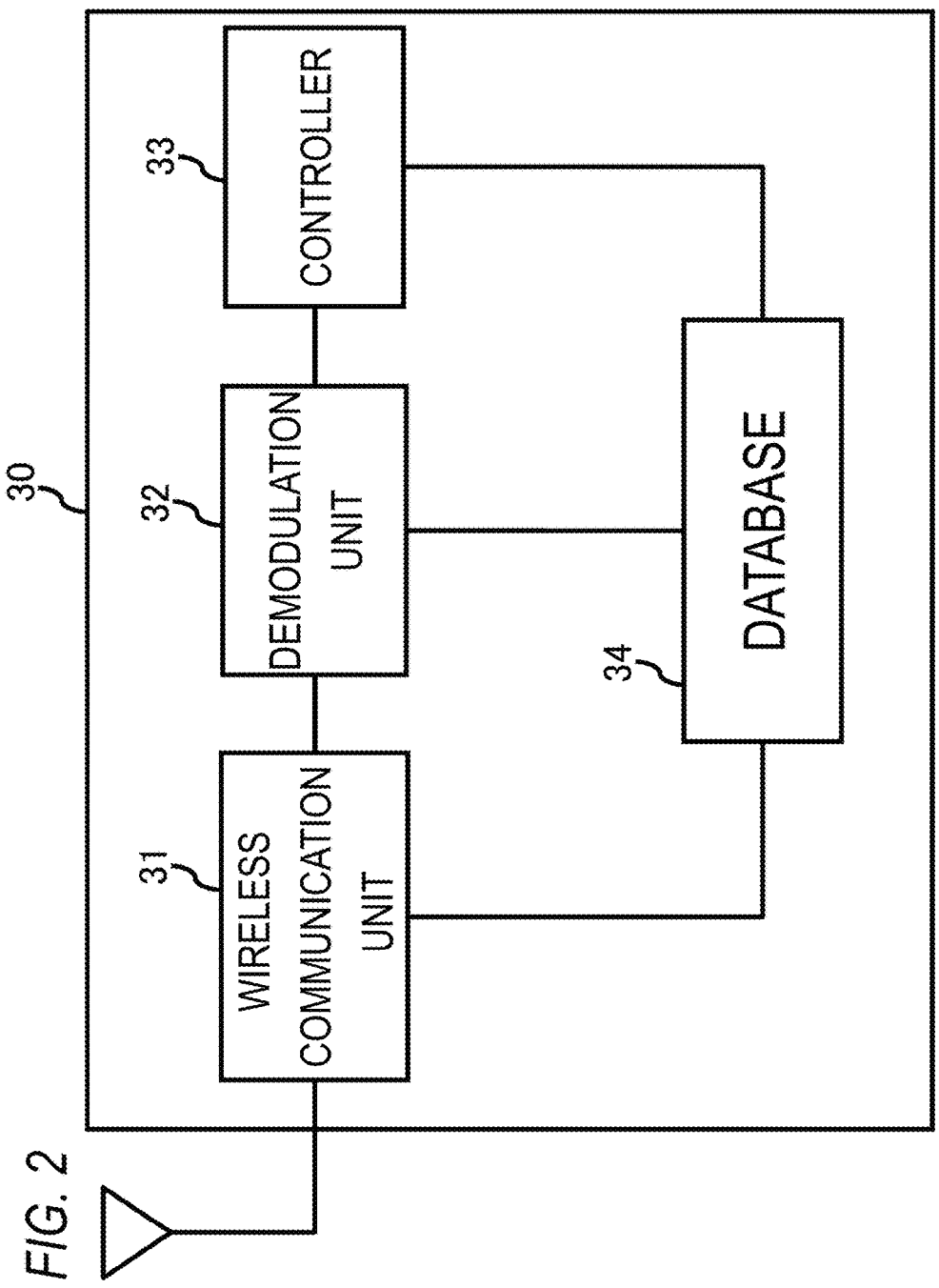
FIG. 2 is a block diagram illustrating a base station according to the first embodiment of this disclosure.

Subsequently, a configuration of the base station according to the embodiment of this disclosure will be described with reference to FIG. 2.

The base station 30 is configured to include a wireless communication unit 31, a demodulation unit 32, a controller 33, and a database 34.

The wireless communication unit 31 is configured to perform wireless communication with the relay device 20 (or the wireless terminal 10). The wireless communication unit 31 is configured to receive information transmitted from the relay device 20, output the received information to the demodulation unit 32, and transmit the information output from the controller 33 to the relay device 20.

The wireless communication unit 31 has a plurality of adaptive array antennas and may be beam-formed The demodulation unit 32 is configured to acquire reception timing from a communication channel of the wireless signal received from the relay device 20 and determine that the communication channel is affected by reflected waves if a difference between the acquired reception timing and reception timing of a control channel is equal to or more than a threshold value.

The controller 33 performs channel allocation processing for a wireless backhaul channel between the relay device 20 and the base station 30.

In detail, the controller 33 confirms whether a communication channel selected by the general carrier sensing process is affected by the reflected waves and then allocates the communication channel. For example, the carrier sensing herein is to confirm the presence or absence of interference waves from other areas prior to allocating the communication channel.

The database 34 stores the communication channel determined to be affected by the reflected waves.

Figure 3:
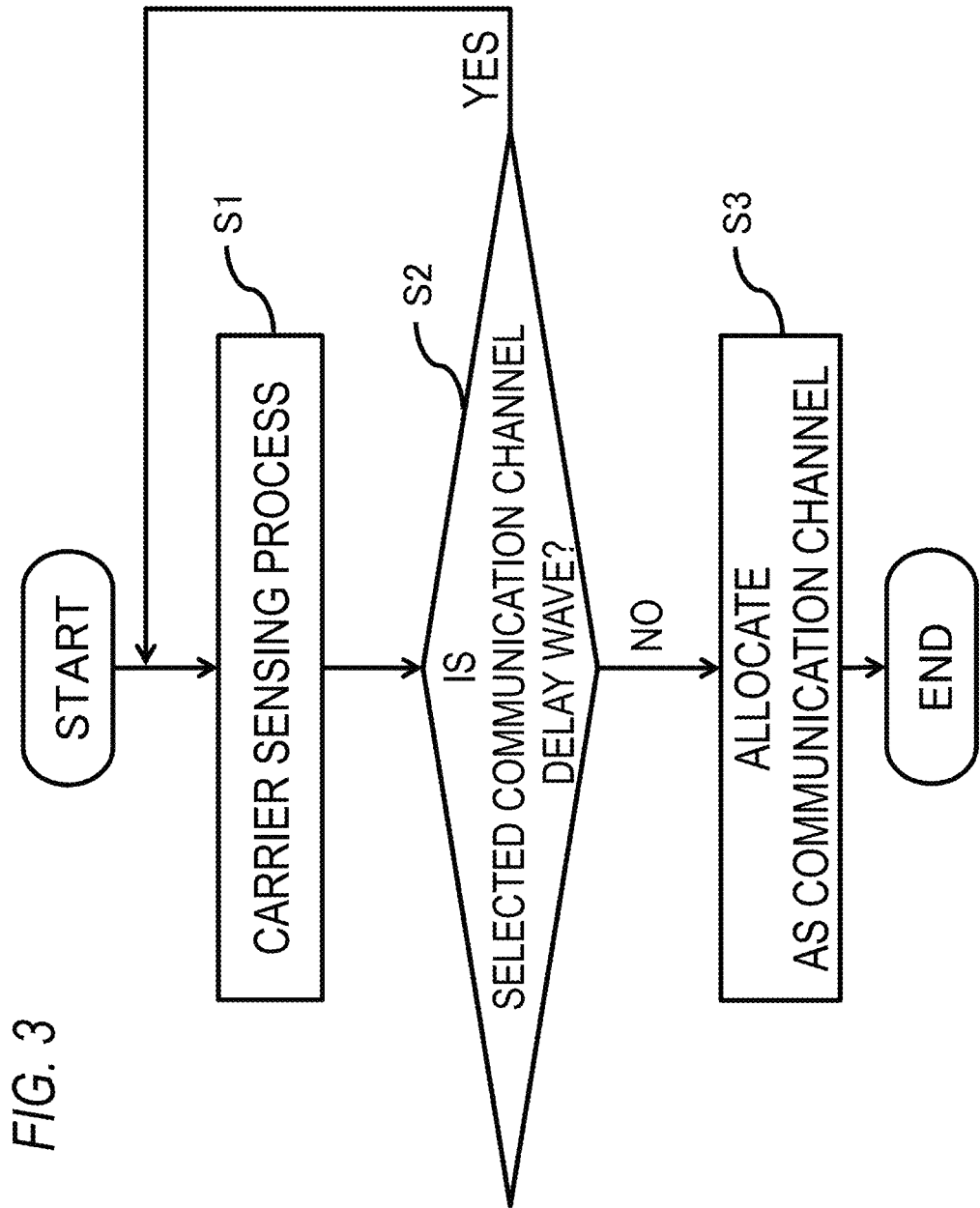
FIG. 3 is a flowchart illustrating a flow of an allocation operation of a wireless backhaul channel in the base station according to the first embodiment of this disclosure.

A flowchart will be described herein with reference to FIG. 3 which indicates a flow of an allocation operation of the wireless backhaul channel in the base station according to the first embodiment of this disclosure.

First, when a connection request of the wireless backhaul channel is sent to the base station 30 from the relay device 20, the controller 33 performs a carrier sensing process to allocate a channel (S1).

The controller 33 estimates and confirms with reference to the database 34 whether the communication channel selected by the carrier sensing is affected by the delay waves (reflected waves) (S2).

Figure 5:
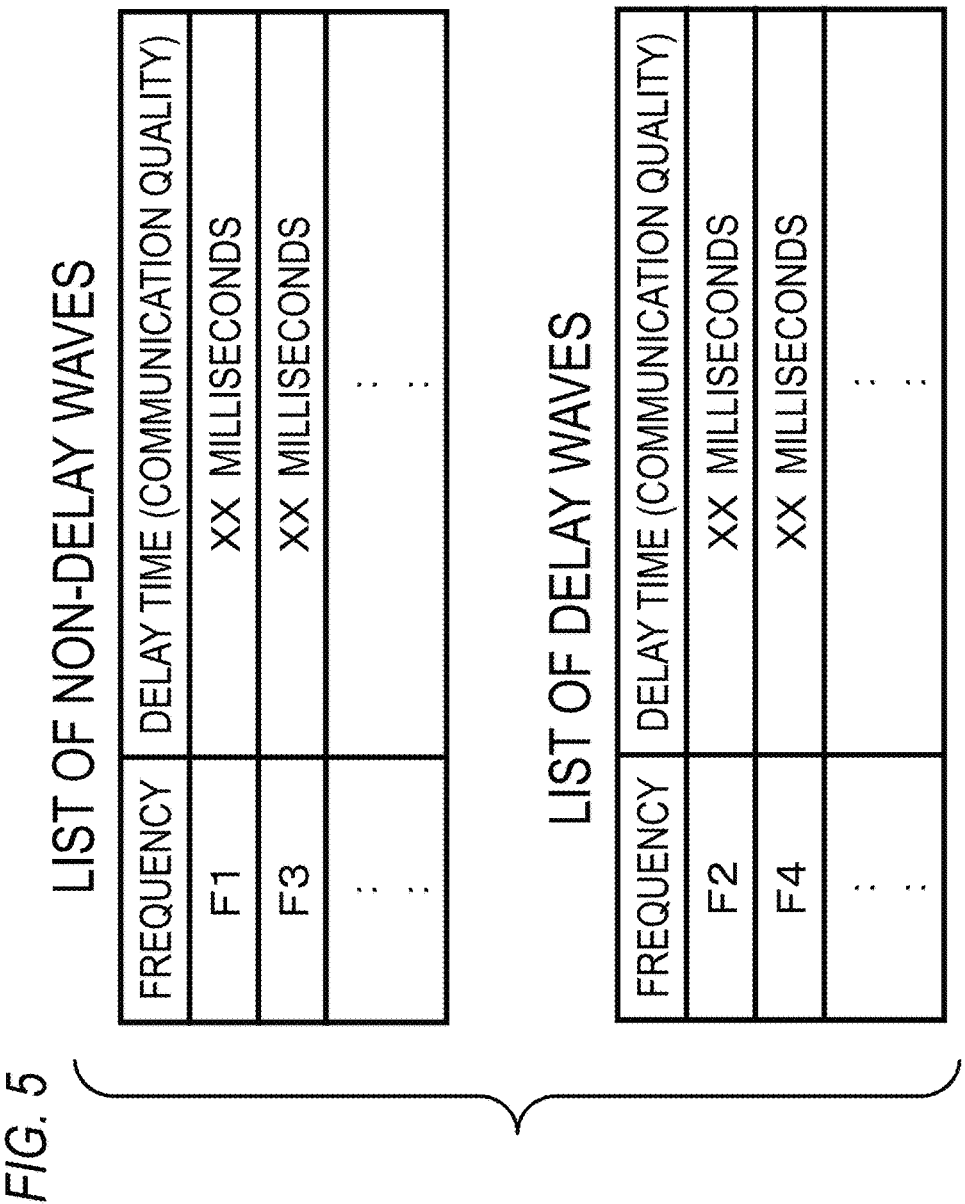
FIG. 5 is a diagram illustrating a list of non-delay waves and a list of delay waves.

A list of non-delay waves and a list of delay waves are illustrated in FIG. 5, and it is assumed that both of them are stored in the database 34. Each list has a frequency of a communication channel and a delay time indicating a difference between the reception timing of the communication channel of the wireless signal received from the relay device 20 and the reception timing of the control channel. A frequency of a communication channel exists in the list of delay waves in a case where the difference is equal to or more than a threshold value. A frequency of a communication channel exists in the list of non-delay waves in a case where the difference is less than the threshold value.

The controller 33 estimates that the communication channel is affected by the delay waves (reflected waves), for example, in a case where the selected communication channel exists in the list of delay waves in step S2, and estimates that the communication channel is not affected by the delay waves (reflected waves) in a case where the selected communication channel exists in the list of non-delay waves.

In a case where it is estimated that the selected communication channel is not affected by the delay waves (reflected waves), the controller 33 allocates the communication channel as a wireless backhaul channel (S3).

In a case where it is estimated that the selected communication channel is affected by the delay waves (reflected waves), the controller 33 performs a carrier sensing process to find the next communication channel.

Figure 4:
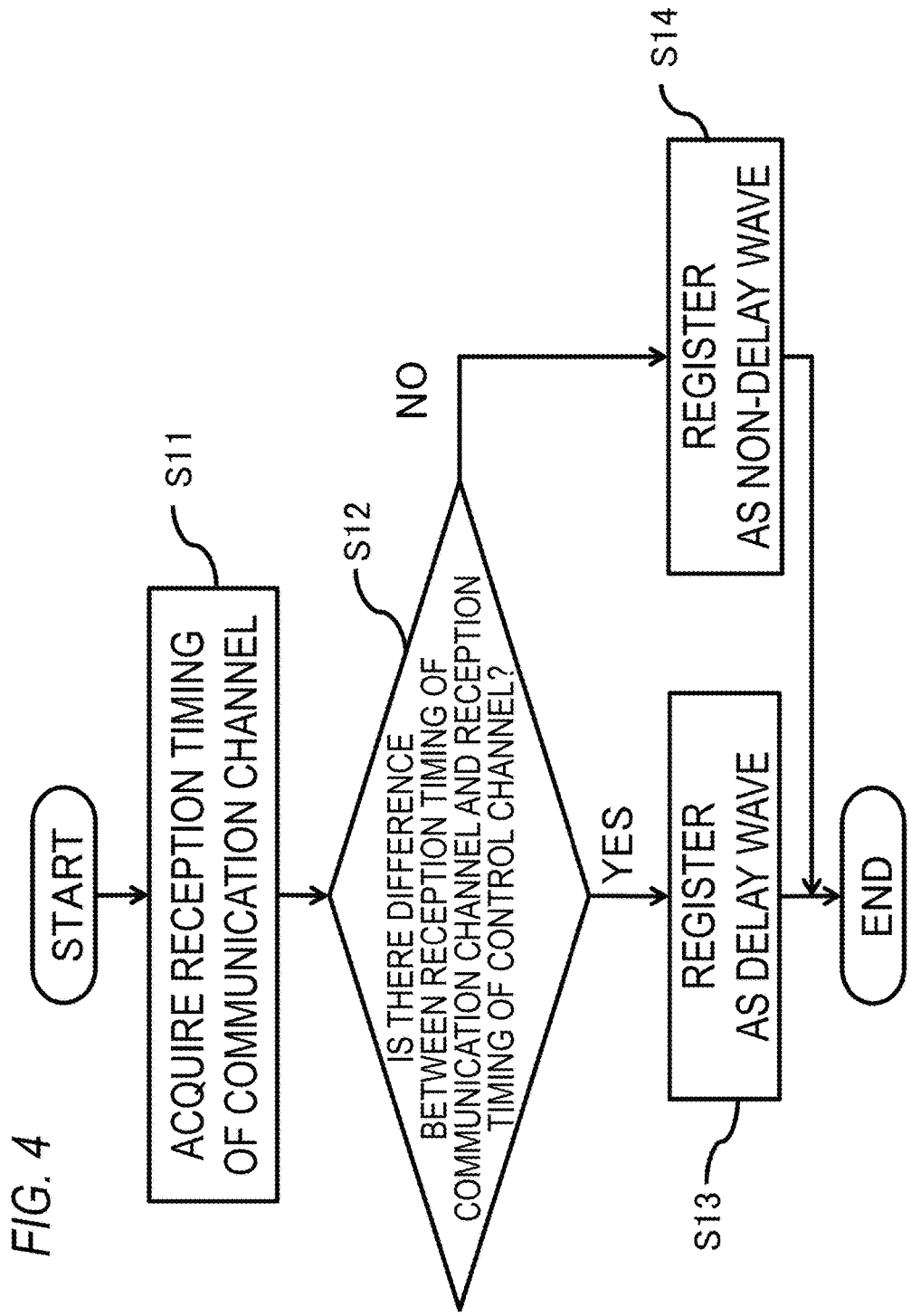
FIG. 4 is a flowchart illustrating a flow of a registration operation of a communication channel in the base station according to the first embodiment of this disclosure.

A flowchart will be described below with reference to FIG. 4 which illustrates a flow of a registration operation of the communication channel in the base station according to the first embodiment of this disclosure.

The demodulation unit 32 acquires a reception timing from the communication channel of the wireless signal received from the relay device 20 (S11).

The demodulation unit 32 (or the controller 33) determines whether a difference between the reception timing of the communication channel and the reception timing of the control channel is equal to or more than a threshold value (S12).

When the difference is equal to or more than the threshold value, the demodulation unit 32 (or the controller 33) registers the communication channel in the database 34 as a communication channel affected by the delay waves (reflected waves) (S13). For example, the communication channel and the difference in timing of the communication channel is registered in the list of delay waves illustrated in FIG. 5.

When the difference is less than the threshold value, the demodulation unit 32 (or the controller 33) registers the communication channel in the database 34 as a communication channel not affected by the delay waves (reflected waves) (S14). For example, the demodulation unit 32 registers the communication channel and the difference in timing of the communication channel in the list of non-delay waves illustrated in FIG. 5.

An updating operation of the communication channel registration may be a timing of receiving the wireless signal from the relay device 20, or may be at regular time intervals.

As described above, the base station according to the first embodiment of this disclosure may be configured to allocate the communication channel as the wireless channel between the base station and the relay device 20 in a case where it is estimated from information in the database 34 that the communication channel is not affected by the delay waves, and may be configured to not allocate the communication channel as the wireless channel between the base station and the relay device 20 in a case where it is estimated from information in the database 34 that the communication channel is affected by the delay waves. Accordingly, it is possible to not be affected by the delay waves of the radio waves transmitted from the relay device 20.

Two lists including the list of non-delay waves and the list of delay waves are illustrated in FIG. 5. However, one list may be prepared which includes the frequency of the communication channel and a delay time indicating the difference between the reception timing of the communication channel of the wireless signal received from the relay device 20 and the reception timing of the control channel. In this case, the controller 33 compares the difference between the reception timing of the selected communication channel and a reception timing corresponding thereto with the threshold value and thus estimates whether the communication channel is affected by the delay waves (reflected waves).

The first embodiment of this disclosure includes the communication channel affected by the delay waves as described above, but other embodiments may include a case where the reflected waves from adjacent buildings are cancelled and the reception level becomes smaller. Even in such a situation, since the level of the received signal received by the base station 30 is reduced, the reception quality deteriorates.

As in the first embodiment of this disclosure, the demodulation unit 32 (or the controller 33) registers a communication channel in which the reception quality deteriorates, that is, a communication channel having the level of the received signal equal to or less than the threshold value in the database 34, as a communication channel affected by the reflected waves.

The controller 33 estimates and confirms whether the communication channel selected by the carrier sensing is affected by the delay waves (reflected waves), with reference to the database 34. In a case where it is estimated that the selected communication channel is a communication channel in which the reception quality does not deteriorate, the controller 33 allocates the communication channel as a wireless backhaul channel. Further, in a case where it is estimated that the selected communication channel is a communication channel in which the reception quality deteriorates, the controller 33 performs a carrier sensing process without allocating to find the next communication channel.

As described above, the base station 30 can be configured not to be affected by the reception level of the radio wave transmitted from the relay device 20.

It is considered that the base station and the relay device are installed in a situation where there is no line-of-sight between the relay device and the base station or in a situation such as a basin-shaped place in which reflected waves arrive from a mountain. In such a situation, the reflected radio wave will be arrived as a delay wave.

Accordingly, this disclosure is to provide a base station, which utilizes a wireless backhaul and is configured not to be affected by reflected waves of radio waves transmitted from a relay station, and a wireless communication method thereof.

Figure 6:
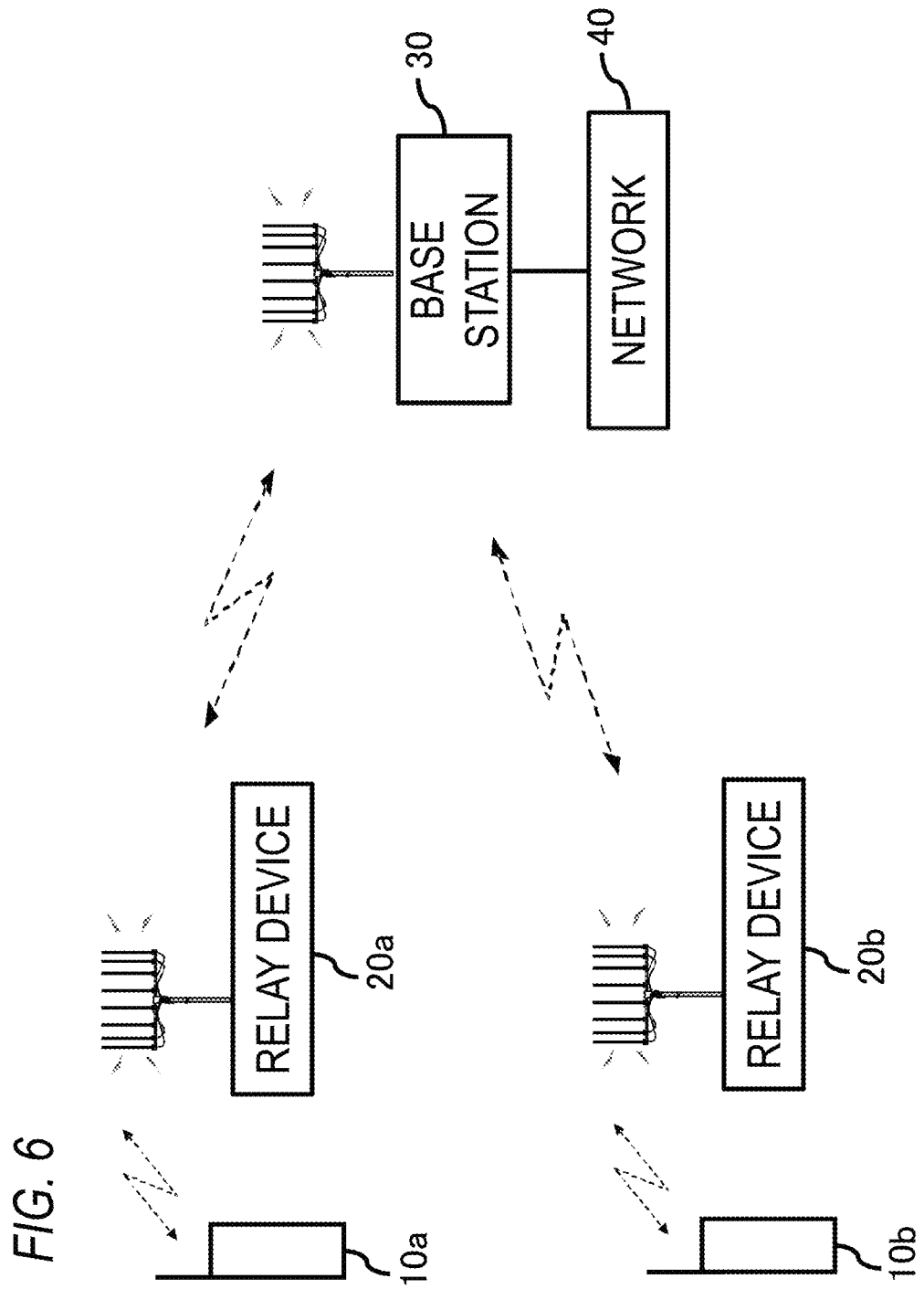
FIG. 6 is a block diagram illustrating a base station according to a second embodiment of this disclosure.

FIG. 6 is a configuration diagram illustrating a wireless communication system according to a second embodiment of this disclosure. The wireless communication system illustrated in FIG. 6 includes wireless terminals 10*a* and 10*b*, relay devices 20*a* and 20*b*, and a base station 30. The relay devices 20*a* and 20*b* are configured to relay information between the respective wireless terminals 10*a* and 10*b* and the base station 30, and the base station 30 is configured to transfer information between the respective relay devices 20*a* and 20*b* and a network 40.

The wireless terminal 10 is respectively distinguished into the wireless terminals 10*a* and 10*b* if necessary, but the wireless terminal 10 is used without being distinguished if not necessary. The relay device 20 is respectively distinguished into the relay devices 20*a* and 20*b* if necessary, but relay device 20 is used without being distinguished if not necessary.

The base station 30 can also communicate with the wireless terminal 10. However, since this configuration will not be related to this disclosure, the description thereof is not made in the second embodiment of this disclosure. The network 40 is a network that is provided by a communication provider, for example, and is a network that transfers information between terminals.

In addition, both of the relay device 20 and the base station 30 are fixed and installed. Both of them perform communication using a time division multiplexing LTE, a frequency division multiplexing LTE, or other communication schemes. Furthermore, both of them may perform communication at a high frequency band such as a millimeter-wave.

The relay device 20*a* is a special relay device, and may be, for example, a relay device for assuring high-quality communication. In addition, the relay device 20*a* may be a relay device owned by a specified service provider or be a relay device for providing a specified service. The base station 30 communicates with the relay device 20*a* and the relay device 20*b* at the same time.

Figure 7:
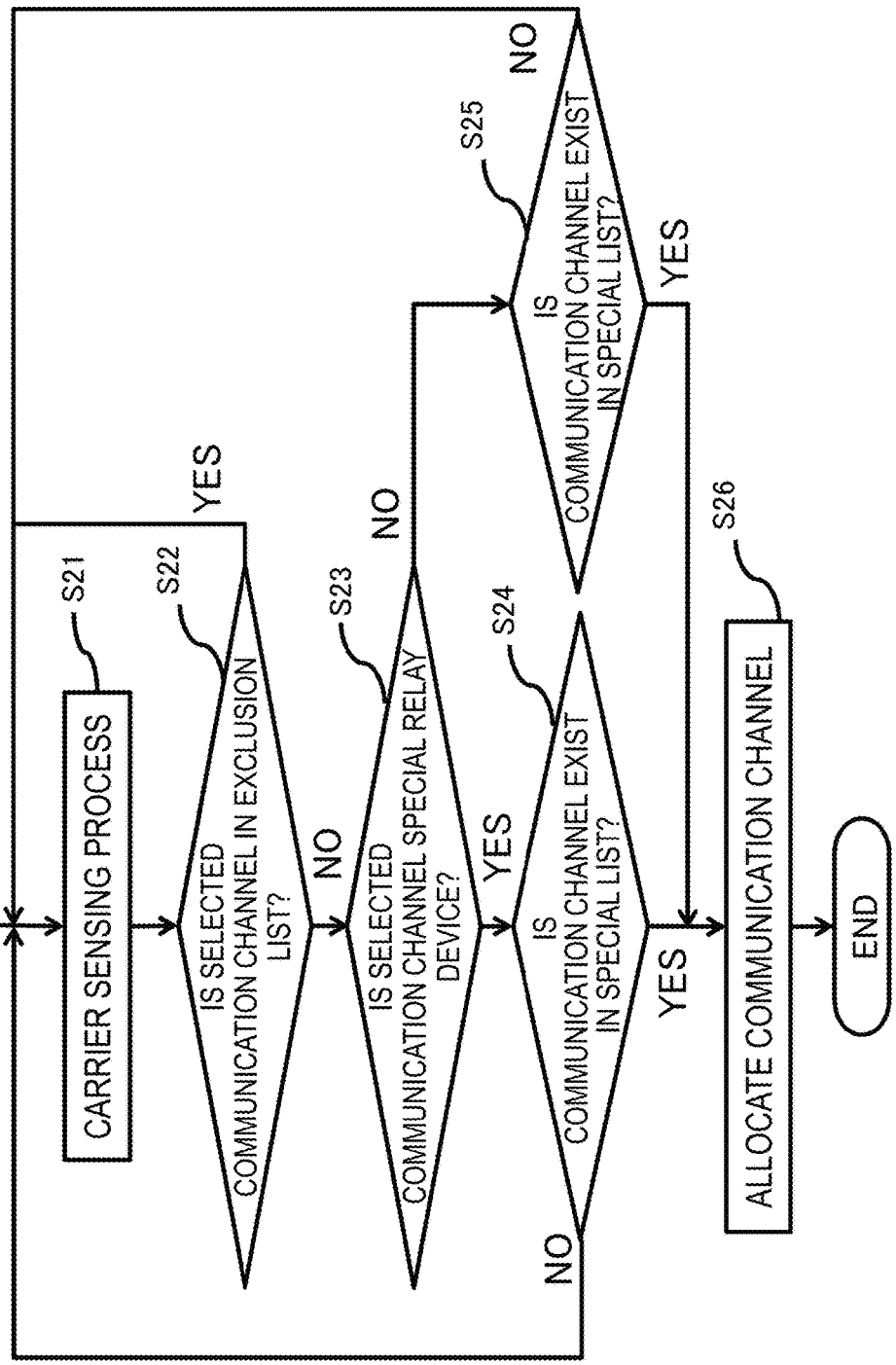
FIG. 7 is a flowchart illustrating a flow of an allocation operation of a wireless backhaul channel in the base station according to the second embodiment of this disclosure.

A flowchart will be described herein with reference to FIG. 7 which indicates a flow of an allocation operation of a wireless backhaul channel in the base station according to the second embodiment of this disclosure.

First, when a connection request of the wireless backhaul channel is sent to the base station 30 from the relay device 20, a controller 33 performs a carrier sensing process to allocate a channel (S21).

The controller 33 estimates and confirms with reference to a database 34 whether the communication channel selected by the carrier sensing satisfies a reception quality of a reception level (S22).

A special list, a normal list, and an exclusion list are illustrated in FIG. 9, and it is assumed that each of the lists is stored in the database 34. Each of the lists has a frequency of a communication channel and a reception level of a communication channel of a wireless signal received from the relay device 20.

A frequency of a communication channel in which the reception level is equal to or more than a threshold value X exists in the special list. A frequency of a communication channel in which the reception level is less than a threshold value Y (Y<X) exists in the exclusion list. A frequency of a communication channel in which the reception level is present between the threshold value X and the threshold value Y exists in the normal list.

The controller 33 performs the carrier sensing process again in a case where the selected communication channel exists in the exclusion list in step S22, for example.

Subsequently, the controller 33 confirms whether the selected communication channel is the special relay device 20a in a case where the selected. communication channel does not exist in the exclusion list (S23).

In a case where the selected communication channel is the special relay device 20a, the controller 33 confirms whether the communication channel exists in the special list (S24). In a case where the communication channel does not exist in the special list, the controller 33 performs the carrier sensing process again. In a case where the communication channel exists in the special list, the controller 33 allocates the communication channel as a wireless backhaul channel (S26).

In a case where the selected communication channel is not the special relay device 20a, the controller 33 confirms whether the communication channel exists in the normal list (S25). In a case where the communication channel does not exist in the normal list, the controller 33 performs the carrier sensing process again. In a case where the communication channel exists in the normal list, the controller 33 allocates the communication channel as a wireless backhaul channel (S26).

In a case where the selected communication channel is not the special relay device 20a, the controller 33 may confirm whether the communication channel exists in the normal list or the special list. In a case where the communication channel exists in neither of the normal list and the special list, the controller 33 performs the carrier sensing process again. In a case where the communication channel exists in either of them, the controller 33 allocates the communication channel as a wireless backhaul channel.

Figure 8:
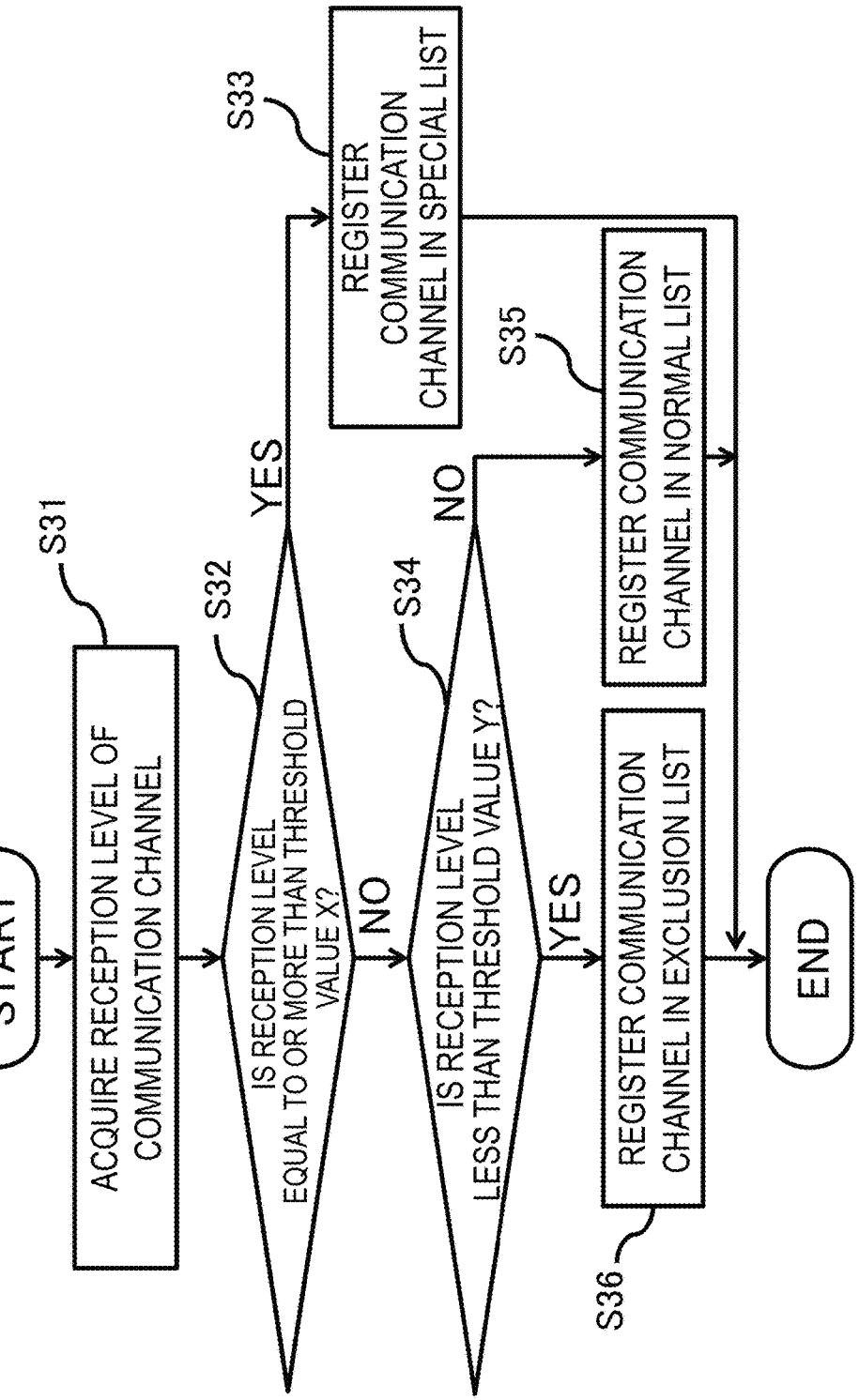
FIG. 8 is a flowchart illustrating a flow of a registration operation of a communication channel in the base station according to the second embodiment of this disclosure.

A flowchart will be described below with reference to FIG. 8 which illustrates a flow of a registration operation of the communication channel in the base station according to the second embodiment of this disclosure.

A demodulation unit 32 acquires a reception level from the communication channel of the wireless signal received from the relay device 20 (S31).

The demodulation unit 32 (or the controller 33) confirms whether the reception level of the communication channel is equal to or more than the threshold value X (S32), and registers the communication channel in the special list if the reception level is equal to or more than the threshold value X (S33). It should be noted that there is a relation of Y<X.

The demodulation unit 32 (or the controller 33) confirms whether the reception level of the communication channel is less than the threshold value Y (S34), registers the communication channel in the exclusion list if the reception level is less than the threshold value Y (S36), and registers the communication channel in the normal list if the reception level is not less than the threshold value Y (S35).

An updating operation of the communication channel registration may be updated at a timing of receiving the wireless signal from the relay device 20, or may be updated at regular time intervals.

As described above, the base station according to the second embodiment of this disclosure is configured to determine from the relation between the frequency and the reception level whether to allocate the communication channel to the special relay device 20a or the relay device 20b, and thus it is possible to allocate an appropriate communication channel depending on the type of the relay device 20, as a wireless backhaul channel.

Three lists, for example, the special list, the normal list, and the exclusion list are illustrated in FIG. 9, but one list may be prepared which includes the frequency of the communication channel and the reception level of the communication channel of the wireless signal received from the relay device 20. In this case, the controller 33 compares the difference between the reception level of the selected communication channel and a reception timing corresponding thereto with each of the threshold values and thus confirms whether the communication channel can be allocated to which of the relay devices 20.

What is claimed is:

1. A base station comprising:
    a wireless communication unit that performs wireless communication with a relay device;
    a storage that stores information on a reflected wave of a communication channel used to communicate with the relay device; and
    a controller that:
    estimates whether a communication channel upon establishing a wireless channel with the relay device is affected by a reflected wave, based on the information and a communication frequency in communication between the relay device and the base station;
    allocates the communication channel as the wireless channel with the relay device in a case where it is estimated from the information that the communication channel is not affected by the reflected wave; and
    does not allocate the communication channel as the wireless channel with the relay device in a case where it is estimated from the information that the communication channel is affected by the reflected wave.

2. The base station according to claim 1,
    wherein the reflected wave is a delay wave that is delayed with respect to a reception timing of a control channel at a time when establishing of the wireless channel with the relay device.

3. The base station according to claim 2,
    wherein in a case where the reflected wave is the delay wave, the information is information of the reception timing of the control channel and a reception timing of the communication channel.

4. The base station according to claim 3,
wherein in a case where the reflected wave is the delay wave, the information is a communication channel having a delay time that a difference between the reception timing of the control channel and the reception timing of the communication channel is equal to or more than a threshold value.

5. The base station according to claim 1,
wherein the information is a level of a reception signal of the communication channel used to communicate with the relay device.

6. The base station according to claim 5,
wherein in a case where the information is the level of the reception signal, the information is a communication channel having the level of the reception signal equal to or less than a threshold value.

7. The base station according to claim 1,
wherein the controller allocates the communication channel depending on a type of the relay device, at a time when establishing of the wireless channel, based on the information.

8. The base station according to claim 1,
wherein the information includes an allocatable communication channel list and an exclusion communication channel list.

9. The base station according to claim 8,
wherein when a communication channel at a time when establishing of the wireless channel with the relay device is included in the allocatable communication channel list, the controller allocates said communication channel as the wireless channel with the relay device, and
wherein when a communication channel at a time when establishing of the wireless channel with the relay device is included in the exclusion communication channel list, the controller does not allocate said communication channel as the wireless channel with the relay device.

10. The base station according to claim 9,
wherein in the allocatable communication channel list, the communication channel depends on a type of the relay device, and
wherein when a communication channel at a time when establishing of the wireless channel with the relay device is included in the allocatable communication channel list in which the communication channel depends on the type of the relay device, the controller allocates said communication channel as the wireless channel with the rely device.

11. The base station according to claim 10,
wherein the type of the relay device includes special and normal, the allocatable communication channel list includes a special list and a normal list,
wherein if the type of the relay device is special, when a communication channel at a time when establishing of the wireless channel with the relay device is included in the special list the controller allocates said communication channel,
if the type of the relay device is normal, when a communication channel at a time when establishing of the wireless channel with the relay device is included in the normal list the controller allocates said communication channel.

12. A wireless communication method of a base station including a wireless communication unit that performs wireless communication with a relay device and a storage that stores information on a reflected wave of a communication channel used to communicate with the relay device, the method comprising:
estimating whether a communication channel upon establishing a wireless channel with the relay device is affected by a reflected wave, based on the information and a communication frequency in communication between the relay device and the base station;
allocating the communication channel as the wireless channel with the relay device in a case where it is estimated from the information that the communication channel is not affected by the reflected wave; and
not allocating the communication channel as the wireless channel with the relay device in a case where it is estimated from the information that the communication channel is affected by the reflected wave.

* * * * *